(12) United States Patent
Higgins (10) Patent No.: US 7,303,198 B2
(45) Date of Patent: Dec. 4, 2007

(54) TROLLEY WHEEL ASSEMBLY

(76) Inventor: Brian John Higgins, 9 Church Street, Cessnock NSW 2325 (AU)

( * ) Notice: Subject to any disclaimer, the term of this patent is extended or adjusted under 35 U.S.C. 154(b) by 233 days.

(21) Appl. No.: 10/474,216

(22) PCT Filed: Mar. 28, 2002

(86) PCT No.: PCT/AU02/00388

§ 371 (c)(1),
(2), (4) Date: Mar. 15, 2004

(87) PCT Pub. No.: WO02/081286

PCT Pub. Date: Oct. 17, 2002

(65) Prior Publication Data

US 2005/0087944 A1    Apr. 28, 2005

(30) Foreign Application Priority Data

Apr. 5, 2001    (AU) .................................... PR 4245
Apr. 26, 2001   (AU) .................................... PR 4621
Nov. 8, 2001    (AU) .................................... PR 8757
Feb. 15, 2002   (AU) .................................... PS 0584

(51) Int. Cl.
*B62B 3/14*    (2006.01)

(52) U.S. Cl. ............................ 280/79.11; 280/33.996; 280/33.991; 280/690; 280/719; 280/112.1; 280/111

(58) Field of Classification Search ........... 280/33.991, 280/33.992, 124.111, 112.1, 33.996, 79.11
See application file for complete search history.

(56) References Cited

U.S. PATENT DOCUMENTS 2,417,019 A * 3/1947 Sherman .............. 280/124.106
2,903,273 A * 9/1959 Hennion ................ 280/33.991
2,935,331 A * 5/1960 Ledgerwood .............. 280/79.3
4,257,580 A * 3/1981 Schnitzius ............... 267/64.28
4,580,800 A   4/1986 Upton et al.
4,688,812 A * 8/1987 Everard ...................... 280/5.2
4,826,186 A   5/1989 Hagelin
5,033,757 A   7/1991 Lloyd
5,564,680 A * 10/1996 Sano et al. ............... 267/64.17
5,772,237 A * 6/1998 Finch et al. ................ 180/65.1
5,871,218 A * 2/1999 Lepage et al. ......... 280/33.992
6,203,029 B1  3/2001 Ondrasik
6,271,755 B1* 8/2001 Prather et al. ........... 340/568.5
6,331,009 B1* 12/2001 Wilkinson ............. 280/33.996
7,198,279 B2* 4/2007 Montalvo .............. 280/33.992

FOREIGN PATENT DOCUMENTS

EP           0352647 B    1/1992
FR           2648775 A    12/1990
WO           WO 9633900 A 10/1996

* cited by examiner

*Primary Examiner*—Christopher P. Ellis
*Assistant Examiner*—Cynthia F. Collado
(74) *Attorney, Agent, or Firm*—Christie, Parker & Hale, LLP (57) ABSTRACT

A trolley includes a front wheel assemblie (12) and a rear wheel assembly both assemblies mounted on a trolley frame. The front wheel assembly (12) includes a fixed wheel assembly (24) to aid control of the trolley. In one form the front wheel assembly (12) includes a pair of swivel castors (18) and a fixed wheel assembly (24) disposed between the castors (18). The front wheel assembly (12) is designed so that when the castors (18) swivel from their orientation for forward travel, the fixed wheel assembly (24) is caused to be lifted off the ground. The trolley also includes a camming device which is operative to lift the front wheel assembly (12) off the ground when the trolley is moved into a nested configuration with a like trolley.

18 Claims, 5 Drawing Sheets

TROLLEY WHEEL ASSEMBLY

CROSS-REFERENCE TO RELATED APPLICATION

This application claims priority of International application No. PCT/AU02/00388, filed Mar. 28, 2002, which in turn claims priority to Australian patent application No. PR 4245, filed Apr. 5, 2001; PR 4621, filed Apr. 26, 2001, PR 8757, filed Nov. 8, 2001 and PS 0584, filed Feb. 15, 2002.

TECHNICAL FIELD

The present invention relates to a trolley and in particular, in one aspect, to a trolley with a modified wheel assembly to aid in control of the trolley. The invention has been designed especially, but not exclusively, for use in shopping trolleys and the invention is herein described in that context. It is to be appreciated however that the invention is not limited to that use.

BACKGROUND OF THE INVENTION

Shopping trolleys are typically configured with four fully swivelling casters, one caster being provided at each corner of the base of the trolley frame to form front and rear wheel assemblies. The use of four fully swivelling casters enables the shopping trolley to be manoeuvred forwards or sideways, however can render the trolley difficult to control, with steering a trolley around a corner or maintaining it in a straight path or on a sloped surface being particularly difficult. With the casters being free to swivel and therefore not providing any sideways resistance, altering the path of the trolley requires the operator to impart a moment directly on the trolley to rotate it as there are no fixed wheels about which the trolley can easily rotate. The difficulty in maneuvering a trolley is increased when loaded with shopping, with the increased weight resulting in an increased moment being required to alter the path of the trolley.

The applicant has found that a shopping trolley having the front pair of wheels fixed from swivelling, with the wheel axles in a co-axial relationship, and the rear wheels being able to swivel, not unlike a motor vehicle, is easier to manoeuvre. A trolley with such a configuration is able to pivot about the fixed set of wheels to alter its direction. The operator need only control this pivoting about the fixed wheels by applying a small sideways force to the trolley handle to direct the trolley along the required path.

Whilst this arrangement is effective, the manoeuvrability of a trolley may be unduly limited, particularly when turning the trolley in tight situations.

SUMMARY OF THE INVENTION

In one aspect, the invention is directed to a trolley comprising a trolley frame, and front and rear wheel assemblies, one of said wheel assemblies including a pair of casters, each including a yoke mounted to the trolley frame in a manner that allows the caster to swivel about a first axis, and a caster wheel mounted to the yoke so as to be rotatable about a second axis which is transverse to said first axis, each caster being operative to adopt a first orientation for forward travel of said trolley, the one wheel assembly being configured so as to lift the trolley frame when the casters swivel about their first axes from the first orientation, and a fixed wheel including at least one wheel which has an axis of rotation which is orientated so that said fixed wheel assembly assists in maintaining directional control of said trolley in its forward travel, the wheel of the fixed wheel assembly being positioned to engage the ground when the castors are in the first orientation and to be off the ground when the trolley frame is lifted by swivelling of the casters about their first axes.

In one form, the fixed wheel assembly is located between the casters.

In one form, the wheels of fixed wheel assembly and the casters in their first orientation are designed to engage the ground. In this arrangement, the fixed wheel assembly provides the directional control for the trolley, whilst the casters which are able to swivel provide the lateral stability for the trolley to prevent tipping.

In another form, the wheel of fixed wheel assembly is designed to project below the level of the caster wheels when in their first orientation so that, in forward travel, the trolley is supported at said one wheel assembly by the fixed wheel assembly. The casters which may be fixed or swivelling, act as outrigger wheels to prevent sideways tipping of the trolley.

In this latter arrangement, preferably the fixed wheel assembly includes a plurality of closely spaced wheels to provide more balanced support at the front of the trolley.

The arrangement of the invention has significant advantages. By providing a central fixed wheel, enables the trolley to be manoeuvred more easily than is the case if the fixed wheels are widely spaced apart. Further, it provides a system which can be easily and inexpensively retrofitted to existing trolleys. It also maintains a useful purpose for the existing casters to enable the trolley to be stably supported. In particular, the arrangement enables the trolley to meet some government requirements whereby a trolley must be supplied with at least four wheels.

In a particular embodiment, the caster wheel in each caster is offset from its first axis so that, in use, the caster wheel swivels about an arc around its first axis. In addition, preferably the caster is mounted to the trolley frame with the first axis inclined to the vertical so that in use, on swivelling of the casters about their respective first axes, the vertical displacement of the centre of the respective casters from a fixed point on the trolley varies.

In one form, each caster is mounted to the trolley so that this vertical displacement is at a minimum when that caster is in its first orientation. This arrangement has particular advantage in that when either of the casters is caused to be angularly spaced about its first axis from the first orientation by a predetermined amount, that caster wheel is lower than the fixed wheel thereby lifting the fixed wheel off the ground. The degree of angular displacement required to provide adequate clearance to fully lift the fixed wheel off the ground will depend on the specific configuration of the wheel assembly, but the applicant has found that displacement of 10-20 degrees from the first orientation is ideal. Further, if the casters are operative to remain in contact with the ground at all times, they can be caused to swivel from the first orientation (and thereby lift the fixed wheel off the ground) simply by applying a sideways force to the trolley. This arrangement has the advantage that the fixed wheel assembly assists in controlling forward movement of the trolley, but does not inhibit sideways movement of the trolley as the caster wheels, as they pivot, would be caused to lift this fixed wheel assembly off the ground. In addition, the fixed wheel can inhibit the trolley inadvertently "running away" when it is stationery as it lessens the tendency to move sideways if parked on a sideways sloping surface.

In one arrangement, the novel wheel assembly may be retrofitted to an existing trolley assembly by securing a fixed wheel assembly to the trolley body. This may be secured to the existing cross bar supporting the caster wheel assemblies or an additional cross bar may be installed. Further, the casters may be arranged to have their axes inclined to the vertical in the desired orientation merely by tilting the trolley frame which can be simply achieved by placing larger casters on the rear wheel assembly. Alternatively the caster swivel axis may be inclined by the addition of an appropriately tapered spacers mounted at the point of attachment of the caster to the trolley.

In another form, an elongate rigid member is used to interconnect the frames of the caster wheel assemblies. In this latter arrangement, preferably the elongate member is used as the axle for the fixed wheel assembly. Appropriate spacers, or fixtures are provided on the axle to properly locate those fixed wheels in place.

In one form of this latter arrangement, the elongate member extends through the frame axles of the respective casters. Further, the caster wheels from the pair of assemblies are removed and are used as part of the fixed wheel assembly. In their place, smaller outrigger wheels are used. The advantage of this arrangement is that the caster wheels are designed to be constantly in contact with the ground. As such, they are ideally suited to be used as the fixed wheel assembly. Further as the outrigger wheels are only used to prevent tipping of the trolley, an inferior wheel may be used as compared to the caster wheels, thereby further reducing the cost of retrofitting.

In yet a further aspect, the invention is directed to a method of retrofitting a trolley using any one of the techniques described above.

In a particularly preferred form, the front wheel assembly includes the fixed wheel assembly. In this arrangement preferably the rear wheel assembly includes pivoting casters, although other arrangements may be used.

Whilst the design of the shopping trolley with a fixed wheel as part of the front wheel assembly aids control of an individual trolley, it may impede the manoeuvrability of the trolleys when in a nested configuration as a train as it significantly restricts the ability to be able to change the direction of the train of trolleys.

Accordingly to a further aspect, the present invention provides a trolley including a trolley frame, and front and rear wheel assemblies mounted on said trolley frame, the trolley being designed to be nested with a like trolley where a front portion of one said trolley is in overlapping relation with a rear portion of another said trolley, and wherein the trolley further includes lifting means which is operative to cause the wheels of the front wheel assembly of the one trolley to be lifted off the ground during nesting of the one trolley with said other trolley.

A trolley according to the above form has significant advantage. The trolley may exhibit improved manoeuvrability by having a fixed wheel assembly at the front wheel assembly according to any form described above. Further, the manoeuvrability of a train of nested trolleys in accordance with the invention is also significantly easier to manoeuvre by virtue of the lifting means which disengages each of the front wheels assemblies of the nested trolleys off the ground. With this arrangement, only the front wheel assembly of the front trolley in the train is in engagement with the ground. Therefore the train includes one fixed front wheel assembly with the remaining wheels being part of the individual trolleys rear wheels which are preferably casters.

This provides an arrangement which is easier to manoeuvre than traditional trains of nested shopping trolleys which includes only swivelling casters. Further, by virtue of the fact that the front wheel assemblies of the nested trolleys is disengaged from the ground, the number of wheels actually in contact with the ground in any train is significantly reduced which further improves the manoeuvrability of the train of nested trolleys.

In one form, the lifting means is in the form of a camming surface arranged to engage a complementary surface on the like trolley during nesting. Through that engagement, the wheels on the front wheel assembly of the one trolley is caused to move off the ground.

This camming arrangement may be located on any suitable part of the trolley such as on the basket, or trolley frame.

In an alternative form, the front wheel assembly may be operative to move out of engagement with the ground using a different mechanism as the lifting means. For example, the wheel assemblies may be pivotable from an extended to a retracted configuration, and wherein on nesting of the one trolley with the like trolley, the front wheel assemblies may be caused to move from their extended position to their retracted position.

In yet a further aspect, the present invention relates to the retrofitting of existing shopping trolleys so as to provide the enhanced manoeuvrability afforded by the shopping trolleys of the earlier aspects of the invention. In particular, in one aspect the invention is directed to retrofitting existing shopping trolleys so as to incorporate the lifting means. This aspect aims to use techniques which are inexpensive which thereby will not be prohibitively expensive to retrofit hundreds of shopping trolleys in a typical supermarket.

In accordance with this further aspect, the invention relates to a camming device for a trolley, the camming device including a body incorporating a camming surface, and attachment means operative to fix the camming device to said shopping trolley, the trolley including a basket incorporating a rear gate and the trolley being designed so as to be able to adopt a nested configuration with a like trolley, where the basket of one trolley locate through the rear gate of another trolley so that when nested, a substantial portion of the basket of the one trolley is disposed within the basket of the like trolley, and wherein in use, when the camming device is fixed to the trolley, the camming surface is operative to engage the other trolley in the nested configuration so as to lift the one trolley as it is moved into the nested configuration so as to cause the front wheel assembly to disengage the ground.

In one form, the camming device includes an elongate member having opposite ends, the member being shaped so as to form a camming surface intermediate the ends, and wherein the attachment means comprises engagement elements located at each end which are operative to be fixed to the trolley.

In one form, the camming device is operative to be secured to the basket of the trolley and the engagement means is preferably in the form of eyelets which are operative to engage respective wire bars of the trolley basket. The advantage of this arrangement is that the camming device is inexpensive, and the method of attachment can be easily performed by providing the eyelets in partially open form on respective wire bars of the basket and merely clinching them to securely affix them in place.

In yet a further aspect, the present invention relates to a method of retrofitting a trolley to incorporate a camming device which includes the steps of providing a camming device in any form described above, and securing the camming device to the trolley in a position so that when the trolley is moved into a nested configuration with a like trolley, the camming device on one of the trolleys is operative to engage the other of the trolley in the nested configuration so as to cause the one trolley to be lifted so that the front wheels disengage the ground in the nested configuration.

It is to be appreciated that the trolley including the lifting means in accordance with these aspects of the invention is ideally suited to be used in conjunction with a trolley including the front wheel assembly with a fixed wheel assembly in accordance with the earlier aspects of the invention. Alternatively, it may be used with trolleys having other arrangements of front wheel assemblies, whether they include a fixed wheel or not.

In yet a further aspect, the invention relates to methods and systems to modify an existing pair of caster wheel assemblies so as to provide a fixed axle wheel arrangement using simple and inexpensive techniques.

Accordingly, in this aspect, there is disclosed herein apparatus adapted to secure a pair of casters mounted on a trolley body against swivelling, each said caster having a wheel mounted on an axle passing through a yoke which is in turn rotatably mounted on said trolley body, said apparatus including:
 a rigid elongate member adapted to pass through an aperture provided in each said yoke such that the rotation axes of said wheels are substantially coaxial, and
 means for fixedly securing said elongate member to said yokes.

Typically said elongate member has a circular cross-section toward each end therefor and is adapted to replace the axle of each of said casters.

Typically said securing means includes a pair of nuts each respectively adapted to thread onto a threaded portion provided at each respective end of said elongate member so as to abut the respective said yoke.

Typically said securing means includes means for abutting each said yoke on an opposing side thereof to the associated elongate member end.

Preferably said abutting means includes a pair of circlips each adapted to be received in a groove provided in said elongate member, each said groove being positioned such that, in use, each said circlip abuts a said frame.

Preferably said abutting means includes a pair of shoulders each defined by a change in cross-section of said elongate member. Alternatively the apparatus further includes a sleeve locatable over the elongate member and wherein opposite ends of the sleeve provides said abutting means.

There is further disclosed herein a method of securing a pair of casters mounted on a trolley body against swivelling, each said caster having a wheel mounted on an axle passing through a yoke which is in turn rotatably mounted on said trolley body, said method including the steps of:
 providing an aperture in the yoke of each of said caster wheel assemblies;
 positioning each said caster such that the rotation axes of said wheels are substantially co-axial;
 passing a rigid elongate member through each said aperture so as to maintain said rotation axes in a substantially co-axial relationship, and
 fixedly securing said elongate member to said yokes.

Typically said elongate member is circular in cross-section towards each end thereof and said step of providing an aperture in each yoke is achieved by removing the axle of each said caster, said elongate member replacing said axles so as to provide said axes of rotation of said wheels.

There is still further disclosed herein a method of modifying the handling characteristics of a shopping trolley having four caster wheel assemblies mounted on the body thereof, said method including the step of securing either the front or rear pair of caster wheels against swivelling according to the above disclosed method.

There is still further disclosed herein a trolley modified by the above method.

Accordingly, the present invention provides a novel trolley and associated methods of modification of existing trolleys, which in some aspects have the advantage of the fixed front wheels, but have improved manoeuvrability, and which may be inexpensively retrofitted to be incorporated into existing trolleys.

BRIEF DESCRIPTION OF THE DRAWINGS

It is convenient to hereinafter describe embodiments of the present invention with reference to the accompanying drawings. It is to be appreciated that the particularity of the drawings and the related description is to be understood as not superseding the generality of the preceding broad description of the invention.

In the drawings.

DETAILED DESCRIPTION OF THE PREFERRED EMBODIMENTS

Figure 1:
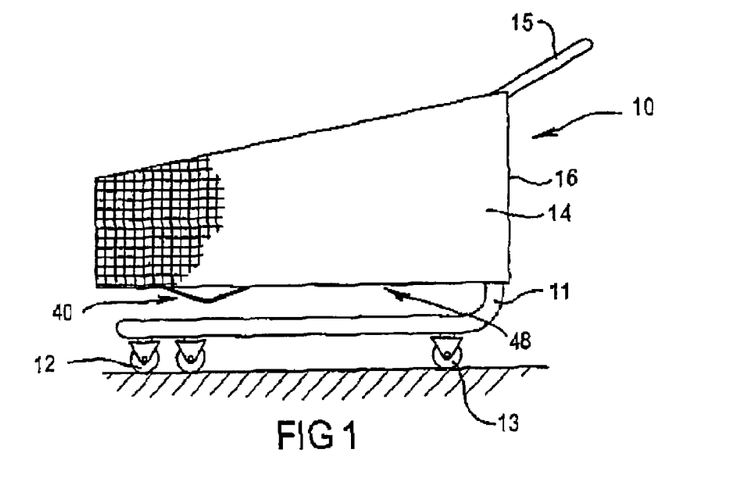
FIG. 1 is a side view of a shopping trolley according to a first embodiment of the invention.

A shopping trolley 10 includes a frame 11 from which the front wheel assembly 12 and a rear wheel assembly 13 is mounted. A wire basket 14 is supported on the frame and includes a handle 15 and rear gate 16. As is typical in shopping trolleys, the rear wheel assembly includes a pair of swivel casters 17 mounted at each back corner of the frame 11.

Figure 2:
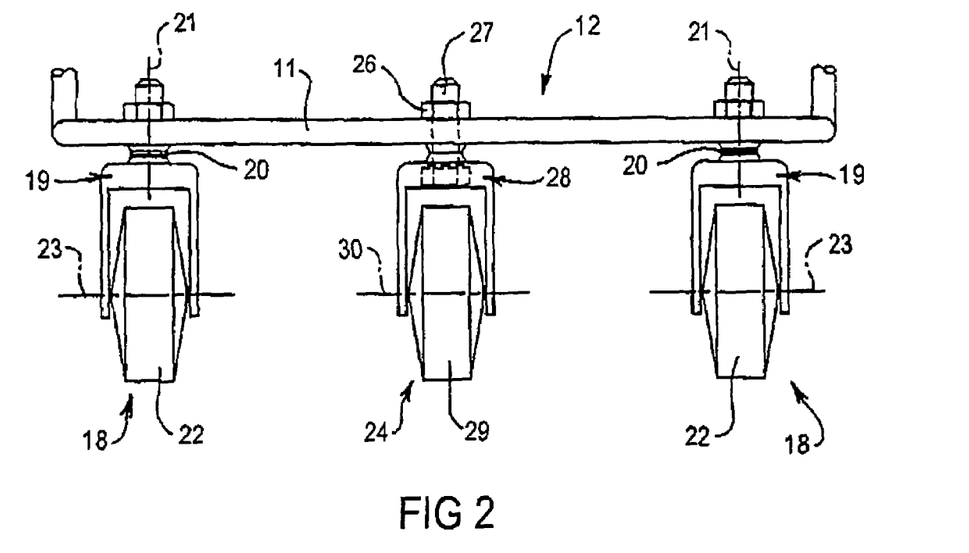
FIG. 2 is a front elevation view of a front wheel assembly of the trolley of FIG. 1.
Figure 3A:
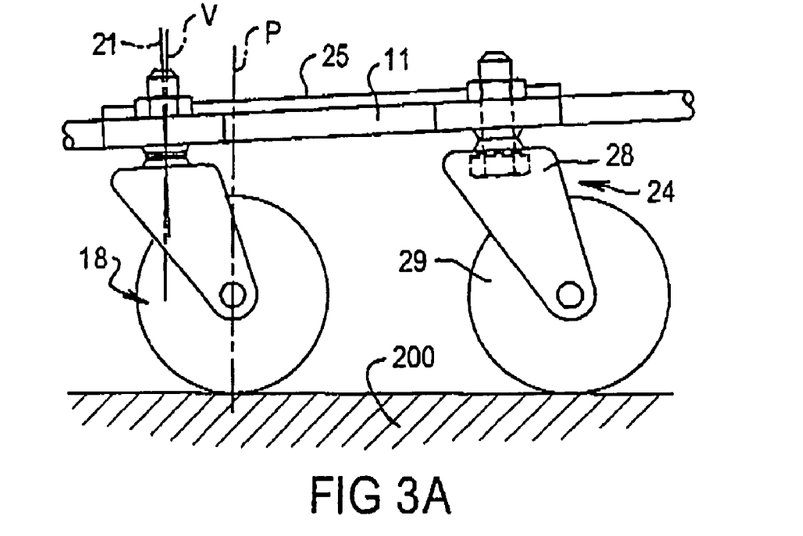
FIGS. 3A and 3B are detailed side elevations of the front wheel assembly of FIG. 2.
Figure 3B:
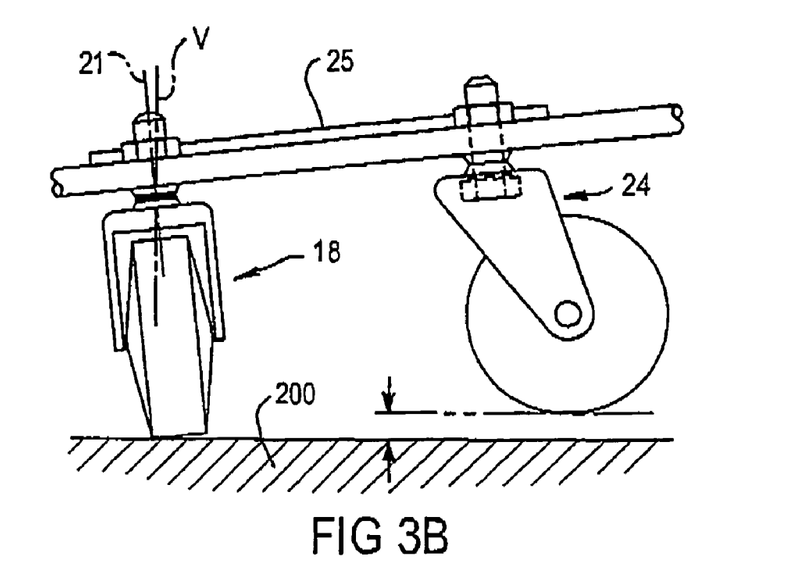

As best illustrated in FIGS. 2, 3A and 3B, the front wheel assembly 12 include a pair of swivel casters which are mounted on respective front corners of the frame 11. Each caster 18 includes a yoke 19 which is arranged to rotate about a king pin 20 allowing the casters 18 to rotate about respective first axes 21. Caster wheels 22 are mounted on the respective yokes 19 and are rotatable about respective second axes 23 which are transverse to their respective first axes 21.

To provide control to the trolley, the front wheel assembly 12 include a centre fixed wheel assembly 24 which is mounted to the trolley frame 11. In the illustrated form, the fixed wheel assembly 24 is displaced rearwardly of the front wheel assembly and is secured by a bracket 25 which is secured to the frame 11. In the illustrated form, the fixed wheel assembly 24 is secured to the bracket 25 by locating a threaded bolt 26 through an aperture in the bracket 25 which is secured in place by a nut 27. It is to be appreciated that other forms of fixing could be employed as will be appreciated by those skilled in the art. Further, the fixed wheel assembly 24 may be located in line with the casters 18 if there is adequate clearance to allow those casters to swivel, or disposed slightly forward.

The fixed wheel assembly 24 is in the form of a non swivelling caster and includes a yoke 28 and a wheel 29 which is mounted to the yoke 28 and rotatable about an axis of rotation 30.

FIGS. 3A and 3B are a side elevation of the front wheel assembly of FIG. 1. As can be seen, in this arrangement, the fixed wheel assembly 24 is secured rearward of the line of the casters 18. In addition, the first axes 21 of the casters 18 are each inclined to the vertical (V). This is achieved in the illustrated embodiment by having the trolley frame 11 slightly inclined forwardly through having larger casters on the rear wheel assembly than the front wheel assembly. Further, as illustrated in FIG. 3A, the centre line (P) of each wheel 22 is displaced from its first axis 21. As such, the caster wheels 22 are designed to move in an arc around their first axes 21. Because each first axis 21 is inclined to the vertical, the plane in which the caster wheels will move on swivelling is inclined to the horizontal plane.

In the illustrated embodiment, the first axes 21 of the casters 18 are inclined in the forward direction of the trolley. As a result of this orientation, when the casters 18 are in a trailing position for forward movement of the trolley as illustrated in FIG. 3A, the caster wheels 22 are at the highest point of their arc. Further, the fixed wheel 29 of the trolley is designed so that it is aligned with the height of the caster wheels at this point so that both the caster wheels 18 and the fixed wheel 29 are engaging with the surface 200 on forward movement of the trolley.

When the caster wheels 100 swivel about their first axes 21 away from the trailing position as shown in FIG. 3A, the distance between the caster wheel centres and the trolley frame 11 increases, which causes the trolley frame 11 to lift. This, in turn, causes the fixed wheel 29 to move off the ground as illustrated in FIG. 3B. This arrangement has significant practical benefit as it enables the fixed wheel 30 to assist in fully maintaining control of the trolley in the forward direction but still enables easy sideways movement of the trolley if required.

Accordingly, front wheel assembly 12 has the advantages of a centralised fixed wheel for pivoting and manoeuvrability of the trolley particularly for forward movement, but which still can provide adequate stability to the trolley to prevent tipping. Further, the design of the front wheel assembly allows unimpeded sideways movement by creating a system where the fixed wheel can disengage the ground on certain orientations of the front casters.

Figure 4:
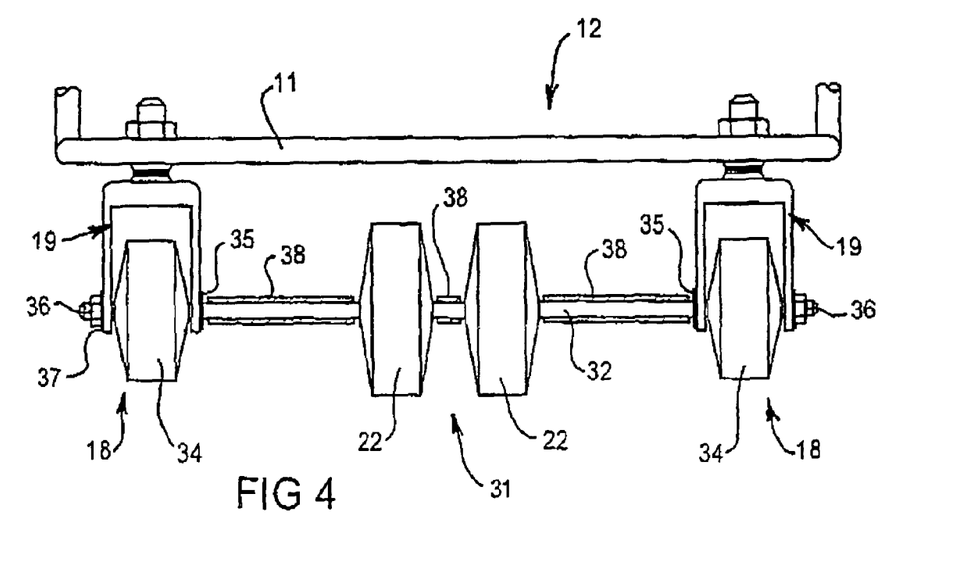
FIG. 4 is a front elevation view of a front wheel assembly for a trolley according to a second embodiment of the invention.

FIG. 4 illustrates a modified version of the front wheel assembly 12. Again the main principal of the wheel assembly 12 is to provide a centralised fixed wheel between the front casters 18 to facilitate manoeuvrability of the trolley.

In this arrangement however, the casters 18 are modified as part of the installation of the fixed wheel assembly 31.

In particular in the arrangement of FIG. 4, the caster wheels 22 are removed from their respective yoke 19 and those yokes are secured against swivelling by a rigid elongate member 32. Outrigger wheels 34 are included in the modified assembly 12 and the caster wheels 22 form part of the fixed centre wheel assembly 31.

In constructing the front wheel assembly 12, an aperture is provided in each of the yokes 19 through which the elongate member 32 may pass when the casters 18 are positioned with the second axis 23 substantially coaxial. Individual axle in each caster 18 is removed so that the elongate member is passed through the axle apertures 35 provided in the respective yokes 19. In the illustrated form, the elongate member 32 includes a threaded portion 36 at each opposite end for receiving a nut 37 to secure the elongate member 32 in place.

In conjunction with installing the elongate member 32 to actually fix the yokes 19, the caster wheels 22 are removed from the yokes 19 and are mounted on the member 32 intermediate the casters 18. Spaces 38 which in the illustrated form are sleeves of metal or plastic, are disposed on the elongate member to locate the caster wheels 22 in their central position. In this way, the elongate member which has a circular cross section provides the axis of rotation for the wheels 22 which are now centrally fixed. It is to be appreciated that other suitable spaces, such as circlips or the like may be used.

In addition, outrigger wheels 34 are installed in the yokes 19 to provide additional stability to the trolley. These outrigger wheels are smaller than the casters 22 and are therefore only designed to come in contact with the ground should the trolley 10 tip.

Figure 6:
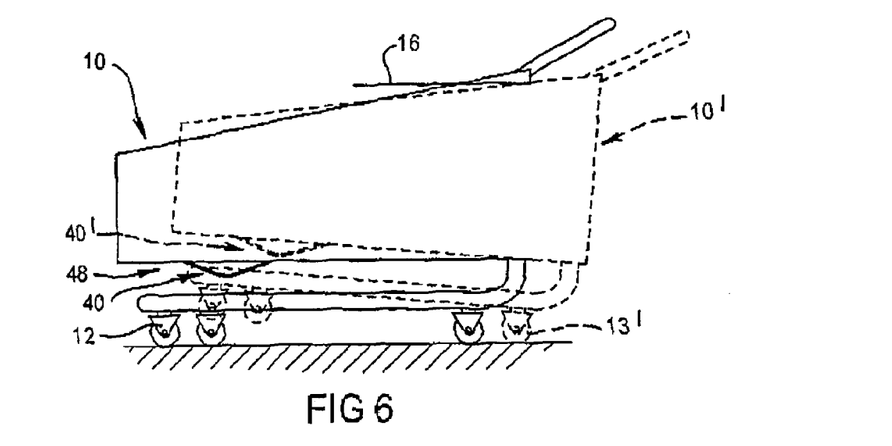
FIG. 6 is a side view of the trolley of FIG. 1 in a nested configuration.

The trolley 10 in any form described above is designed to nest with a like trolley 10' as best shown in FIG. 6. Specifically the trolley basket 14 with the pivoting rear gate 16, tapers towards its front. With this arrangement, the trolley 10 is able to nest with the like trolley 10' with the basket 14 locating through the rear gate 16' of the like trolley 10' so that when nested, the basket 14 of the trolley is disposed within the basket 14' of the like trolley.

Figure 5:
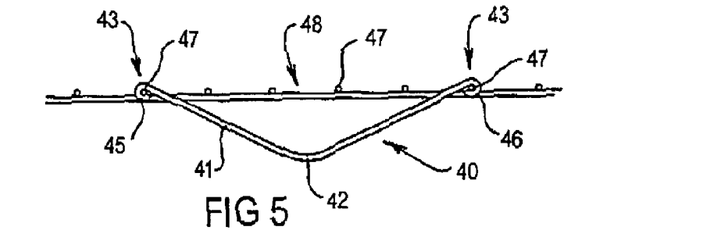
FIG. 5 is a detailed view of the camming device in the trolley of FIG. 1.

The trolley 10 includes a camming device 40 which is mounted to the basket 16. The device 40 includes an elongate metal member 41 which is arcuately shaped so as to form a cam surface 42 over its mid region. Each end (44,46) of the member 41 includes rolled over edges to form eyelets 45, 46. Wire bars 47 of the basket 16 are operative to locate within the eyelets 45, 46 so as to secure the camming device to the basket.

To retrofit the camming device to the shopping trolley 10, the member 41 is provided with the eyelets partially opened so as to enable respective bars 47 of the basket 14 to be received in the eyelets whereafter they are secured in place by clinching the respective eyelets to close them.

In fitting the camming device 40 in place, the shopping trolley 10 may be provided with a single device, or multiple devices may be provided. Further, in the illustrated form, the camming devices 40 extends downwardly from a bottom surface 48 of the basket 14. The advantage of this arrangement is that it places the camming device out of the way and does not reduce the volume of the material which can be provided within the trolley basket 14. Further, the formation of eyelets 45,46 at the end of the member provides a convenient safety edge to the camming device 20 which is unlikely to provide a pinch point or sharp edge which could otherwise catch on material placed in the basket 14.

The inclusion of the camming device 40 is designed to cause a shopping trolley 10' when moved into a nested configuration to lift to a sufficient degree to cause the front wheel assembly 12' of nested trolley 10' to disengage the ground. This is achieved by the camming surface 22 moving into engagement with the bottom surface 48' of the trolley basket 14'. By virtue of this engagement of surfaces, the trolley 10' is caused to lift disengaging the front wheel assemblies 12' from the ground. It is to be appreciated that the camming device 40 could be disposed to extend upwardly from the base of the trolley basket 14 and achieve the same result when a trolley is moved into a nesting configuration.

When in this nested configuration, the lifting of the front wheel assemblies 12' ensures that these assemblies do not impede the manoeuvrability of a train of the trolleys in a nested configuration.

FIGS. 7 to 11 disclose yet a further form of modifying the casters of the front wheel assembly 12. This embodiment has many similarities to the embodiment shown with reference to FIG. 4 with the exception that the modified trolley does not include a central fixed wheel assembly.

Figure 7:
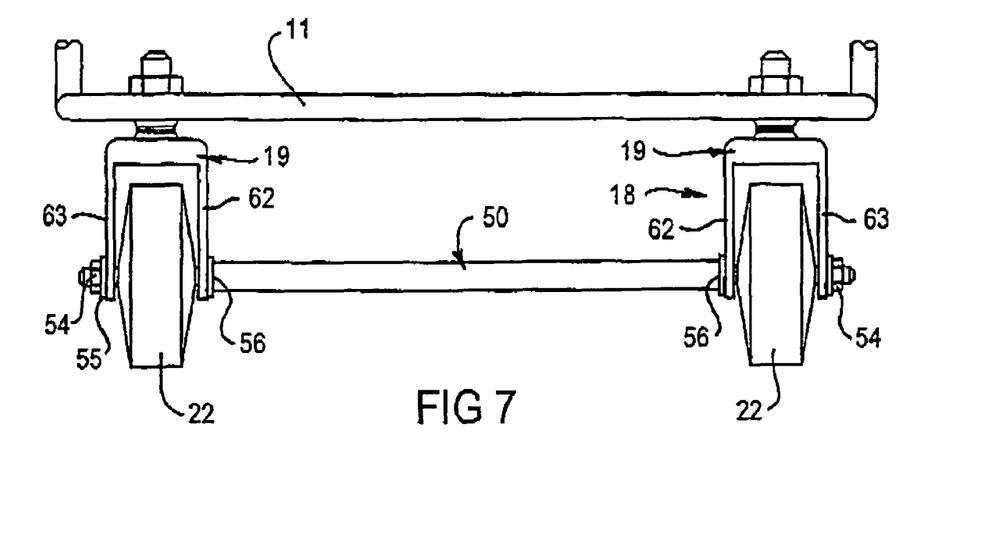
FIG. 7 is a front elevation view of a pair of casters mounted on a trolley body and modified with the apparatus of a further embodiment of the invention.
Figure 8:
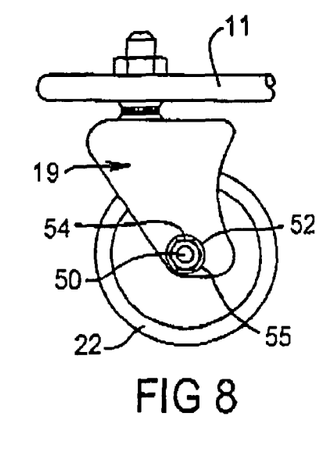
FIG. 8 is a side elevation view of the casters of FIG. 7.

As best shown in FIG. 7, the wheels 22 of the casters 18 are secured against swivelling by a rigid elongate member 50. An aperture is provided in each of the yokes 19 through which the elongate member 50 may pass when the casters 18 are positioned with the rotation axes of the wheels 22 substantially co-axial. In one embodiment, the axles 51 of each wheel are removed so that the elongate member is passed through the axle apertures 52 provided in the yokes 19. The elongate member 50, whose ends have a circular cross-section, thus replaces the axles so as to provide the axes of rotation of the wheels 22, ensuring that the axes of rotation are co-axial. The elongate member 50 is then fixedly secured to the yokes 19.

Figure 10:
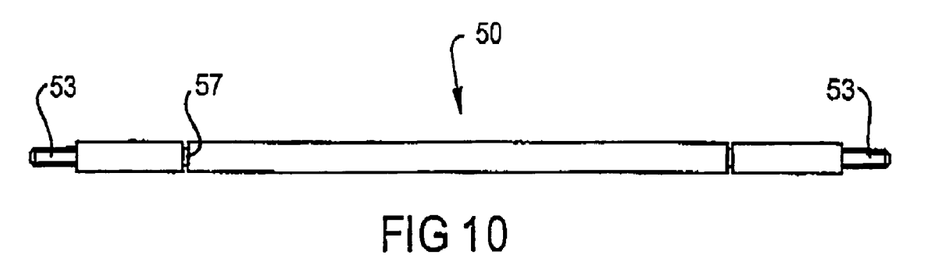
FIG. 10 is a front elevation view of an elongate rod of the apparatus of FIG. 7.

The elongate member 50 of this embodiment, which is in the form of a circular rod, is best depicted in FIG. 10. A threaded portion 53 is provided at each opposing end of the elongate rod 50 for receiving a nut 54. A nut 54 is threaded onto each threaded portion 53 once the elongate rod has passed through the apertures 52. Each nut 54 is tightened onto the threaded portion 53 until it abuts the associated yoke 19 adjacent the elongate frame end. A washer 55 is typically provided between the nut 54 and yoke 19. Fastening the nuts 54 onto each end of the elongate rod 50 thus fixedly secures the elongate rod 50, with each end secured to its respective yoke 19. The rotation axes of the wheels 22 are thus fixed in the substantially co-axial relationship.

To further secure the elongate rod 50, means may be provided to abut each yoke 19 on an opposing side thereof to the associated elongate member end. In the first embodiment this means is provided by circlips 56. The circlips 56 each abut an inner fork 62 of yoke 19, whilst a nut 54 abuts an outer fork 63 on the opposing side of the yoke 19. With each yoke 19 being abutted on opposing sides, the securing thereof is more robust. Each circlip 56 is received in a circumferential groove 57 provided in the elongate member 50 at a position adjacent to the inner fork 62 of each yoke 19 when the elongate member 50 is in position.

Figure 11:
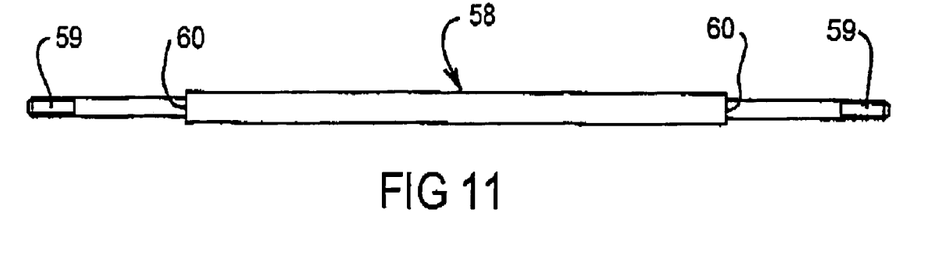
FIG. 11 is a front elevation view of an elongate rod of the apparatus of FIG. 9.

An alternative elongate member 58 is depicted in FIG. 11. Like elongate member 50 it is provided with threaded portions 59 for receiving nuts 57. However, in place of the grooves 57 for receiving circlips, shoulders 60 are provided at positions corresponding to adjacent the inner fork 62 of each yoke 19. The shoulders 60 are formed by a change in cross-section of the elongate member 58 from a larger cross-section in a central region to smaller cross-sections at outer regions of the elongate member. These shoulders 60 thus abut the inner forks 62 when the elongate member 58 is in position, helping to further secure the yokes 19 against swivelling. Rather than providing integral shoulders 60, the same abutment effect could be achieved by sliding a sleeve over a constant cross section elongate member, the sleeve having a length approximating the distance between the inner forks 62.

Figure 9:
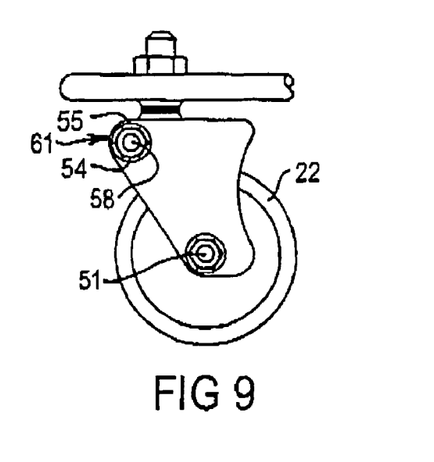
FIG. 9 is a side elevation view of a pair of casters modified in an alternative manner.

Rather than pass either of the alternate elongate members 50, 58 through the aperture 52 usually occupied by the wheel axles 51, a separate aperture 61 may be provided on each yoke 19 away from the wheels 22 as depicted in FIG. 9. The elongated rod 50, 58 is thus passed through the apertures 61 and secured to the yokes 19 in the manner discussed above. The original axles 51 remain in place.

Other alternative forms of securing the elongate member 50, 58 to the frames will be appreciated by the person skilled in the art. One such alternative form would be the use of circlips to replace the nuts 54 abutting the outer forks 63.

It is preferred that the modified wheel assemblies to include a fixed wheel assembly in any form detailed above is installed on the front wheel assembly 12 as the provision of an elongate rod spanning the rear casters 17 or the presence of a centre fixed wheel may act as a barrier to nesting of trolleys one inside the other. The elongate member or fixed wheel assembly may jamb against the front of a trolley being stacked into the back of a trolley so modified. It is also preferred that the wheels 22 are positioned such that their rotation axes are co-axial, however slight misalignment, including a slight toe-in or toe-out of the wheels will still provide effective manoeuvrability.

It is to be appreciated that variations and/or modifications may be made to the parts previously described without departing from the spirit or ambit of the invention.

The invention claimed is:

1. A trolley comprising:
    a trolley frame;
    front and rear wheel assemblies, one of the front and rear wheel assemblies including a pair of casters;
    each of the pair of casters having a first axis and a second axis transverse to the first axis and including a yoke mounted to the trolley frame in a manner that allows the caster to swivel about the first axis, and a caster wheel mounted to the yoke so as to be rotatable about the second axis, each of the pair of casters being operative to adopt a first orientation for forward travel of said trolley; and
    a fixed wheel assembly located between said pair of casters, said fixed wheel assembly including at least one wheel which has an axis of rotation which is orientated so that said fixed wheel assembly assists in maintaining directional control of said trolley in its forward travel, wherein
    the trolley frame is caused to lift on swiveling of the casters from their first orientation by having the centre of the caster wheels radially displaced from their first axes and having the first axes inclined to the vertical and extending rearwardly of the trolley and the at least one wheel of the fixed wheel assembly is positioned to engage the ground when the castors are in their first orientations and to be off the ground on swivelling of the casters about their first axes from their first orientations.

2. A trolley according to claim 1, wherein the fixed wheel assembly is disposed between the casters.

3. A trolley according to claim 1, wherein the wheel assembly including the pair of casters is the front wheel assembly.

4. A trolley according to claim 3, wherein the wheel of the fixed wheel assembly is aligned with the casters of the front wheel assembly.

5. A trolley according to claim 3, wherein the fixed wheel assembly is displaced either forward or rearward of the casters of the front wheel assembly.

6. A trolley according to claim 1, wherein the other of the front and rear wheel assemblies also includes a pair of casters, each caster having a first axis and a second axis transverse to the first axis and including a yoke mounted to the trolley frame in a manner that allows the caster to swivel about the first axis, and a caster wheel mounted to the yoke so as to be rotatable about the second axis, each of the pair of casters of the other wheel assembly being operative to adopt a first orientation for forward travel of said trolley.

7. A trolley according to claim 1, wherein the fixed wheel assembly is the form of a fixed caster including a yoke mounted to the trolley frame, and a caster wheel rotatably mounted to the yoke.

8. A trolley according to claim 1, wherein the trolley is designed to be nested with another said trolley, wherein the front portion of one trolley is in overlapping relation with the rear portion of the other trolley, and wherein the trolley further comprises lifting means which is operative to cause the wheels of the front wheel assembly of the one trolley to be lifted off the ground on nesting of the two trolleys.

9. A trolley according to claim 8, wherein the lifting means is in the form of complementary surfaces arranged to interengage during nesting of the trolleys.

10. A trolley according to claim 9, further comprising a camming device which includes a camming surface, the camming device being secured to the trolley so that the camming surface forms one of the complementary surfaces and engages a surface of the other trolley on nesting of the trolleys.

11. A trolley according to claim 10, wherein the trolley further comprises a basket having a rear gate, and wherein on nesting, the basket of the one trolley locates in the basket of the other trolley through the rear gate, and wherein the camming surface is positioned so as to engage a surface of the basket to cause lifting of the one trolley.

12. A trolley according to claim 11, wherein the camming device is mounted on a base surface of the basket and projects downwardly therefrom.

13. A trolley according to claim 11, wherein the camming device is mounted to a base of the basket and projects upwardly therefrom.

14. A trolley according to claim 10, wherein the camming device comprises an elongate member having opposite ends and being profiled to form the camming surface intermediate the ends, the member further comprising engagement elements located at each end which are arranged to be fixed to the basket of said trolley.

15. A trolley according to claim 14, wherein the basket of the trolley is formed from wire mesh and the engagement elements are in the form of eyelets which are operative to engage respective wire bars of the trolley basket.

16. A trolley comprising:
a trolley frame;
a basket having a rear gate mounted on the trolley frame;
front and rear wheel assemblies, the front wheel assembly including a pair of casters;
each of the pair of casters having a first axis and a second axis transverse to the first axis and including a yoke mounted to the trolley frame in a manner that allows the caster to swivel about the first axis, and a caster wheel mounted to the yoke so as to be rotatable about the second axis with the centre of the caster wheel being radially displaced from the first axis, each of the pair of casters being operative to adopt a first orientation for forward travel of said trolley;
a fixed wheel assembly located between said pair of casters, said fixed wheel assembly including at least one wheel which has an axis of rotation which is orientated so that said fixed wheel assembly assists in maintaining directional control of said trolley in its forward travel; and
a camming device which includes a camming surface; wherein
the trolley is arranged to be nested with another said trolley where the basket of one trolley locates in the basket of the other trolley through the rear gate and wherein the camming surface is positioned so as to engage a surface of the basket of said other trolley to causing lifting of the one trolley.

17. A trolley according to claim 10, wherein the camming device comprises an elongate member having opposite ends and being profiled to form the camming surface intermediate the ends, the member further comprising engagement elements located at each end which are operative arranged to be fixed to the basket of said trolley.

18. A trolley according to claim 14, wherein the basket of the trolley is formed from wire mesh and the engagement elements are in the form of eyelets which are operative to engage respective wire bars of the trolley basket.

* * * * *